United States Patent
Setzler

(10) Patent No.: US 7,239,653 B2
(45) Date of Patent: Jul. 3, 2007

(54) METHOD AND APPARATUS FOR GENERATING MID AND LONG IR WAVELENGTH RADIATION

(75) Inventor: Scott D. Setzler, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/540,298

(22) PCT Filed: Dec. 31, 2003

(86) PCT No.: PCT/US03/41710

§ 371 (c)(1),
(2), (4) Date: Jun. 21, 2005

(87) PCT Pub. No.: WO2005/003845

PCT Pub. Date: Jan. 13, 2005

(65) Prior Publication Data

US 2006/0050749 A1    Mar. 9, 2006

Related U.S. Application Data

(60) Provisional application No. 60/444,544, filed on Feb. 3, 2003.

(51) Int. Cl.
*H01S 3/30*  (2006.01)
*H01S 3/10*  (2006.01)
*H01S 3/14*  (2006.01)
*H01S 3/08*  (2006.01)

(52) U.S. Cl. .............................. 372/20; 372/4; 372/21; 372/39; 372/92

(58) Field of Classification Search .................... 372/4, 372/20, 21
See application file for complete search history.

(56) References Cited

U.S. PATENT DOCUMENTS 5,457,707 A * 10/1995 Sobey et al. .................. 372/20
6,785,041 B1 * 8/2004 Vodopyanov ............... 359/330

\* cited by examiner

*Primary Examiner*—Armando Rodriguez
(74) *Attorney, Agent, or Firm*—Robert K. Tendler; Daniel J. Long

(57) ABSTRACT

A narrow line width optical parametric oscillator (OPO) (10) is used a pump for a tunable optical parametric oscillator to enable it to produce a mid and long wavelength IR output over a wide 5–20 micron bandwidth. The pumping OPO (10) is then set up to be non-colinearly phase matched. To enable the pumping OPO (10) to exhibit the narrow line width, it is seeded with a narrow line width seeding source. The result is output energy having an extremely narrow 4 nanometer line width. The narrowness of the pumping OPO (10) output is derived first by using non-colinear phase matching in the pumping OPO (10) and secondly by using seeding in the pumping of the pumping OPO (10).

24 Claims, 4 Drawing Sheets

METHOD AND APPARATUS FOR GENERATING MID AND LONG IR WAVELENGTH RADIATION

CROSS REFERENCE TO RELATED APPLICATION

This application claims rights under 35 U.S.C. 119(e) from U.S. patent application Ser. No. 60/444,544, filed Feb. 3, 2003.

FIELD OF THE INVENTION

This invention relates to the generation of mid and long infrared wavelengths and more particularly to the pumping of a cadmium germanium arsenide tunable optical parametric oscillator with very narrow line width to permit generation of the mid and long infrared wavelength radiation.

BACKGROUND OF THE INVENTION

Coherent sources of infrared radiation have been used in the past for a variety of purposes, not the least of which has been in infrared countermeasure systems. Typically, for laser range finding and for jamming purposes, laser systems have been provided which project 1.5–3 micron radiation towards a target. In some cases, the targets are the seekers used in shoulder-fired or other types of missiles.

There is, however, a need to provide longer wavelength infrared radiation for two distinct purposes. The first is to be able to detect and countermeasure missile seekers which are now utilizing longer wavelengths in the mid infrared above 5 microns all the way out to the long infrared at 20 microns.

Additionally, longer wavelength infrared sources are useful for spectrum analysis purposes and also to be able to detect pollutants or chemical warfare agents in the atmosphere. Specifically, it is important to be able to recognize the existence of gaseous chemical agents dispersed in the atmosphere, and for this purpose mid to long wavelength infrared radiation is required.

In the past there have been multitude ways to generate longer IR wavelengths. To date $CO_2$ lasers, some diode lasers and quantum well lasers have been able to produce infrared radiation in the 10 micron range. However, these lasers are not tunable over a wide bandwidth. For instance, $CO_2$ lasers are only tunable between 9–11 microns.

More recently, it has been found that cadmium germanium arsenide optical parametric oscillators can be utilized as a wideband mid to long wavelength infrared source, assuming enough power could be used to pump the optical parametric oscillator at 5 to 6 microns. This, however, has been difficult because pumping sources for such an optical parametric oscillator have not had sufficiently narrow line widths so as to be able to concentrate enough energy into the cadmium germanium arsenide nonlinear crystal.

If one were able to produce a narrow enough line width with a 5 micron pump, then one would be able to generate a tunable continuum of wavelengths from 5 microns out to 20 microns with the cadmium germanium arsenide optical parametric oscillator. Note that the tuning of such an optical parametric oscillator can be achieved either by angle tuning or temperature variation so as to have a true tunable broadband source.

There is therefore a problem insofar as being able to find a way to take a 5 micron laser source and make it narrow enough to pump the cadmium germanium arsenide optical parametric oscillator. The ability to do so would permit not only the countermeasure application but also use in spectroscopy and gas detection.

It will be noted that prior longer wavelength IR lasers such as the aforementioned $CO_2$ laser are tunable by gratings to permit tuning between 9 and 11 microns. However, this is a narrow window and if one were looking for a broadbanded IR source, carbon dioxide lasers are not particularly useful.

As mentioned hereinbefore, with cadmium germanium arsenide optical parametric oscillators, prior efforts to efficiently pump such an optical parametric oscillator met with failure due to the fact that the line width of the 5 micron pumping radiation was too broad.

More particularly and by way of further background, zinc germanium phosphide ($ZnGeP_2$, or ZGP) is the only mature nonlinear crystal capable of generating high power, tunable optical parametric oscillator (OPO) output beyond 4 microns. A high nonlinear coefficient (76 pm/V), high thermal conductivity (0.36 W/cm K), linear and nonlinear absorption below 1.8 μm, and exceptional transparency beyond 1.9 μm, make it the material of choice for 2-micron pumped OPOs as is disclosed in P. G. Schunemann, "Nonlinear crystals provide high power for the mid-IR," Laser Focus World 35, 85–88 (1999). While several other materials have been used to demonstrate tunable output in the mid-infrared, few are suitable for high power operation beyond 4 microns, either due to high absorption losses or poor thermal conductivity.

As to far-infrared OPOs, cadmium germanium arsenide ($CdGeAs_2$, or CGA) is another nonlinear optical material currently under development. It has one of the highest known nonlinear coefficients (216 pm/V) and is useful for generation of tunable OPO output from 5–20 μm as is disclosed in P. G. Schunemann, "Nonlinear crystals provide high power for the mid-IR," Laser Focus World 35, 85–88 (1999), but requires a pump source >4.6 um to avoid two-photon pump absorption. One of the few usefully intense pump sources is the idler from a ZGP OPO, but the spectral characteristics are generally too broad to make it an effective pump source.

Narrow mid-IR line width has been demonstrated in Type I ZGP OPOs by use of a grating and etalon tuning elements F. Ganikhov, T. Caughey, and K. L. Vodopyanov, "Narrow-linewidth middle-infrared ZGP optical parametric oscillator," J. Opt. Soc. Am. B 18, 818–822 (2001), but such a geometry is not conducive to high power, low threshold operation. Type II operation with a 2 μm pump, which has much narrower OPO acceptance bandwidth than Type I, cannot phase match idler wavelengths below 5.5 μm. The spectral output can be narrowed by use of a singly resonant oscillator (SRO) configuration, but this increases threshold beyond practically acceptable levels. Additionally, one may line-narrow the pump source, running on a single longitudinal mode, but this is often impractical from an engineering and fieldability standpoint.

SUMMARY OF INVENTION

It has now been found that one can effectively pump a cadmium germanium arsenide optical parametric oscillator with an optical parametric oscillator, called a pumping optical parametric oscillator, that has a 5 micron idler output, the line width of which being on the order of 4 to 5 nanometers. Previously, ZGP OPO pumping sources in the 5 micron range have only been capable of producing 160 nanometer line width energy.

In order to operate the pumping optical parametric oscillator with such narrow line widths, two techniques are utilized. The first is tuning the pumping optical parametric oscillator to provide non-colinear phase matching. This reduces the intrinsic bandwidth of the parametric oscillator based on the dispersion properties of the material in the parametric oscillator and involves the refractive index or the speed of the pump wave that travels in the crystal.

It is noted that there is an intrinsic bandwidth that can be supported in the optical parametric oscillator and that this intrinsic bandwidth, assuming colinear phase matching, is on the order of 160 nanometers at 5.2 microns or 60 cm$^{-1}$ in energy units. If, however, one chooses to operate the optical parametric oscillator in non-colinear phase matching geometry, then one can reduce the initial 160 nanometer line width to approximately 20 nanometers or 8 cm$^{-1}$ in energy units.

However, this 20 nanometer line width can be even further reduced by using a narrow line width seed source. The result of using such a narrow line width seed source is to further narrow the output of the pumping optical parametric oscillator to between 4 and 5 manometers or 1.8 cm$^{-1}$ in energy units.

The seed in essence operates to kick start the parametric process in the optical parametric oscillator such that as the oscillator starts to oscillate, while it originally operates to build up and generate wavelengths from background noise, the seed provides photons of the appropriate signal wavelength so that upon activation there is a background of photons that rise up at once. By providing a seed source, the seed in essence tells the oscillator where to build up in gain. Thus the seed provides photons inside the optical parametric oscillator cavity that are orders of magnitude more intense than the background noise, resulting in preferentially turning on the signal wavelength. In one embodiment the signal is at 3.39 microns.

One choice for a pumping optical parametric oscillator is zinc germanium phosphide, with the zinc germanium phosphide optical parametric oscillators typically pumped at 2 microns. A typical pump laser for a zinc germanium phosphide optical parametric oscillator is a holmium-doped yttrium lithium fluoride Ho:YLF laser. This produces a relatively narrow line width, 2.055 micron beam. When this beam is utilized to pump the pumping optical parametric oscillator, the result is a 160 nanometer line width 5 micron output for the pumping optical parametric oscillator, assuming that the pumping optical parametric oscillator is colinearly phase matched. When the pumping optical parametric oscillator is non-colinearly phase matched, the line width drops from 160 nanometers to 20 nanometers.

In one embodiment, the signal of the ZGP OPO is seeded with a 3.39 micron output of a helium neon laser to provide a seeding source that has an exceptionally narrow line width. It is important to note that both the Ho:YLF and HeNe seed sources each have a line width less than ½ nanometer. When this seed source is introduced into the zinc germanium phosphide optical parametric oscillator, it has been found that the 5 micron idler has a line width of no more than 5 nanometers. This is ideal for pumping the tunable cadmium germanium arsenide optical parametric oscillator.

In so doing, one has an IR laser source which is tunable between 5 and 20 microns and which has usable output power in the nature of watts.

With such a broadband IR source, one now has the ability to detect and countermeasure devices operating at much longer IR wavelengths than the usual 1.5–3 microns. Thus the subject system is adaptable to whatever long wavelengths will be used in the future for missile seekers and the like.

Moreover, this new mid to long wavelength infrared source can be used for gas detection for such gases as mustard gas which have absorption spectrums in the long IR. By having a tunable source that can tune to wavelengths where absorption of mustard gas occurs and where it doesn't, one can deduce from reflected power from the atmosphere whether or not the particular gas is present. Not only are chemical warfare agents in gaseous form detectable by this method, so are any other atmospheric pollutants.

Moreover, the long IR wavelengths are uniquely utilizable for laser communication because these wavelengths are less affected by fog. The reason is that in these long wavelengths the laser radiation scatters less. While there are transmission windows that are suitable for laser communication, when fog rolls in, the short wavelength communication beams get well scattered because the fog particles are about the same size as the wavelength of the light being used. If one could have a wavelength much, much longer than the scattering wavelength it is possible to communicate through the fog using laser-based communication devices.

Note it can be demonstrated that the 4 to 5 nanometer line width of the idler from the zinc germanium arsenide optical parametric oscillator exactly corresponds well to the intrinsic ½ nanometer line width of the pump laser.

Thus it has been found that while there is a natural wide line width to the pumping optical parametric oscillator, this can be significantly reduced by non-colinear phase matching. One can, however, improve markedly on this line width by having a narrower line width seed. Thus the seed laser has to have a narrower in-band line width than the natural line width of the pumping optical parametric oscillator.

While the non-colinear phase matching results in a 10- to 20-fold reduction in line width over the natural line width, seeding further reduces the line width by a factor of 2 to 4.

In summary, an ultra narrow line width optical parametric oscillator (OPO) is used as a pump for a tunable optical parametric oscillator to enable it to produce a mid and long wavelength IR output over a wide 5–20 micron bandwidth. To enable the pumping OPO to produce the ultra narrow line width, it is pumped with a conventional (un-narrowed) laser in combination with a narrow line width seeding source. The pumping OPO is then set up to be non-colinearly phase matched. The result is output energy having an extremely narrow 4 nanometer line width. The narrowness of the pumping OPO output is derived first by using non-colinear phase matching in the pumping OPO and secondly by using seeding in the pumping of the pumping OPO.

In one embodiment, the tunable optical parametric oscillator is a cadmium germanium arsenide OPO and the pumping OPO is a zinc germanium phosphide OPO. The zinc germanium phosphide crystal is tuned to select the 3.39 micron signal and to output the 5.2 micron idler. A Ho:YLF laser is used to pump the pumping OPO at 2 microns. An narrow line width (<<0.5 nanometer) 3.39 micron seed is generated by a HeNe laser. The narrow line width seed is injected into the pumping OPO collinearly with either the signal or idler resonant beam with the 2 micron pump to provide a nominal ½ nanometer line width to pump the pumping OPO. This in combination with the line width narrowing associated with non-colinear phase matching in the pumping OPO results in the 4–5 nanometer line width for the 5 micron idler used to pump the tunable OPO.

The narrowness of the 5 micron pump from the pumping OPO is what makes possible putting enough energy into the tunable OPO so that it can provide the broadbanded mid and long IR 5 to 20 micron output.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
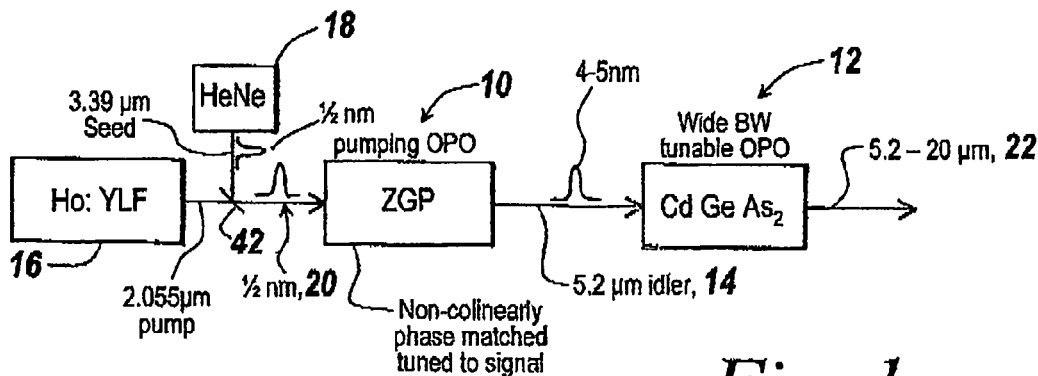
FIG. 1 is a diagrammatic representation of the utilization of a ZGP pumping OPO with a 5.2 micron idler having a line width of between 4 and 5 nanometers to pump a wide bandwidth tunable $CdGeAs_2$ tunable OPO.

Referring now to FIG. 1, whether singly resonant or doubly resonant, a pumping OPO 10 is utilized to pump a broadly tunable OPO 12 with a 5.2 micron idler 14 having a 4–5 nanometer line width.

Pumping OPO 10 is itself pumped with a Ho:YLF pumping laser 16 which produces a 2.055 micron pump that is mixed with the output of the 3.39 micron output of a HeNe laser seed source to provide pumping energy which has a ½ nanometer line width as illustrated at 20.

Pumping OPO 10 is non-colinearly phase matched which, as will be seen, means aligning the OPO cavity at a small angle less than 2° with respect to the pump laser propagation direction.

When wide bandwidth tunable OPO 12, which has a cadmium germanium arsenide crystal, is pumped with the ultra-narrow line width 5.2 micron idler from pumping OPO 10, then the output of tunable OPO 12 is between 5 and 20 microns, thus to be able to accommodate foreseeable countermeasure scenarios as well as spectroscopy and environmental testing applications.

Figure 2:
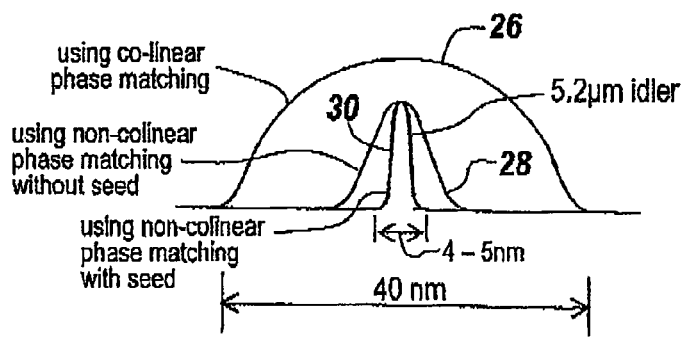
FIG. 2 is a diagrammatic illustration of the width of the output of the pumping OPO of FIG. 1, using colinear phase matching, non-colinear phase matching without a seed and non-colinear phase matching with a seed, thus to provide the 5.2 micron idler with a 4–5 nanometer line width.

Referring to FIG. 2, the naturally occurring line width of the pumping OPO 10 is illustrated by curve 26 to be that associated with colinear phase matching in a doubly resonant OPO. Typically, for a doubly resonant OPO, this line width is on the order of 160 nanometers. Curve 28 shows the effect of using non-colinear phase matching without a seed, which drops the 160 nanometer line width to a minimum of 20 nanometers. This is comparable to the linewidth one would expect from a singly resonant OPO. Indeed, despite the DRO nature of the output mirror, the fact that the cavity is now mis-aligned relative to the pump source allows only the signal or the idler wave to resonate. However, as can be seen by curve 30, when injecting a seed laser collinearly with the signal source into the pumping OPO 10, the line width of the idler output is further reduced now to a 4–5 nanometer line width. It is this narrowing of the line width of the output of the pumping OPO that permits pumping the wide bandwidth tunable OPO 12 with a 5.2 micron signal that is the idler from pumping OPO 10.

Figure 3:
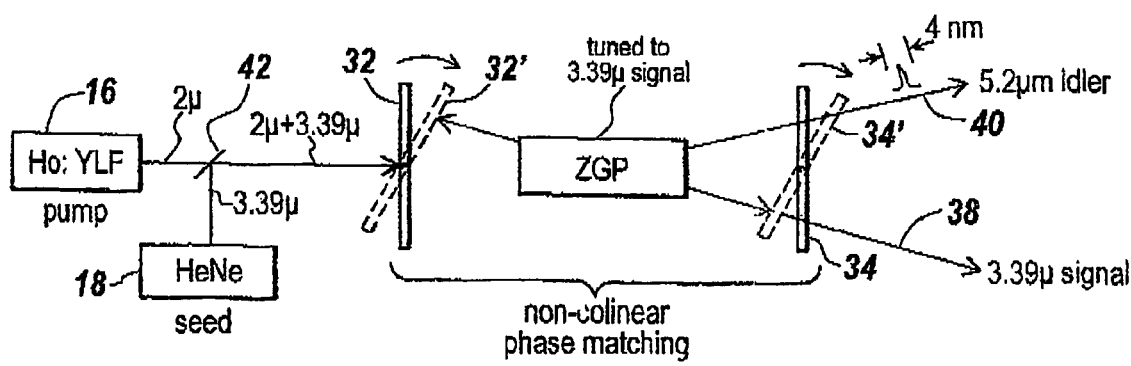
FIG. 3 is a diagrammatic illustration of the tuning of the pumping OPO of FIG. 1, illustrating mirror adjustment to tune to the 3.39 micron signal, thus to produce the 5.2 micron narrow line width idler as well as the 3.39 micron signal.

Referring now to FIG. 3, one mechanism for providing non-colinear phase matching is to provide that the end mirrors 32 and 34 of the cavity surrounding the ZGP crystal are angle tuned such as is illustrated at 32' and 34', the angle of the end mirrors of the cavity are aligned to resonate only the 3.39 signal. This signal is outputted as illustrated at 38. Also output is the 5.2 micron idler at 40, which has the aforementioned 20 nanometer line width.

The non-colinear phase matching is enhanced through the use of the aforementioned HeNe seed 18 when combined with the Ho:YLF pump 16 output, at beam combiner 42. The OPO input mirror 32' must be nominally 5% transmissive at the signal wavelength to allow the seed source into the pumping OPO cavity. If the mirror is too transparent (>>5% transmissive) then the OPO cannot operate well.

Figure 4:
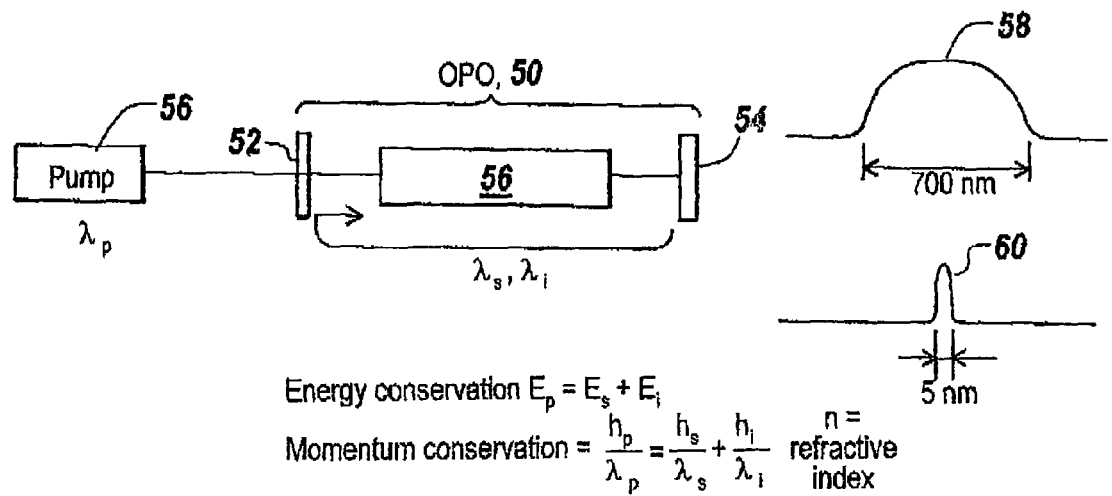
FIG. 4 is a diagrammatic illustration of the pumping of an OPO so as to circulate both a signal and an idler in a DRO.

In order to explain non-colinear phase matching and referring to FIG. 4, an OPO 50 having end mirrors 52 and 54 is pumped with a pump source 56 having a wavelength $\lambda p$. If OPO 50 is a doubly resonant collinearly phasematched oscillator with a nonlinear crystal 56 between mirrors 52 and 54, then a signal, $\lambda s$, and an idler, $\lambda i$, recirculate between the mirrors, with the result being a relatively wide 160 nanometer line width 58. It is the purpose of the subject invention to be able to provide a technique which narrows this natural 160 nanometer line width to less than 5 nanometers as illustrated at 60.

Energy conservation and the momentum conservation expressions of FIG. 4 illustrate that the energy of a pump photon is shared between the energy of a signal photon and the energy of a idler photon, whereas with momentum conservation the refractive index over the signal wavelength plus the refractive index of the idler over the idler wavelength must equal the pump photon momentum.

Figure 5:
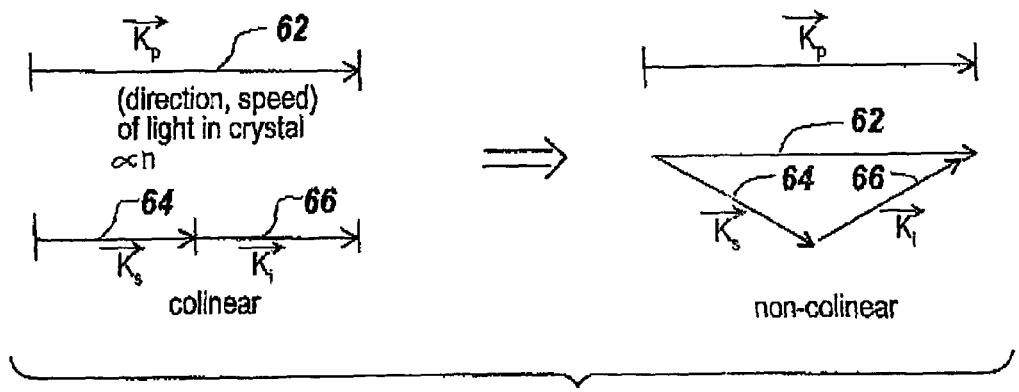
FIG. 5 is a diagrammatic illustration of the effect of the vector addition of the signal and idler vectors in both the colinear and the non-colinear case.

Referring to FIG. 5, what can be seen is that there is a constant K associated with the pumping source, with the constant being described as a vector $K_p$ having a vector denoted by reference character 62. This vector represents direction and speed of light in the crystal and is proportional to the refractive index of the crystal. Given the energy conservation and momentum conservation described in FIG. 4, for colinear phase matching vector $K_s$ and vector $K_i$ are parallel, with the magnitude of the sum of these vectors equaling the magnitude of $K_p$.

For non-colinear phase matching, the $K_s$ and $K_i$ vectors are not along vector 62 as illustrated but are as illustrated at 64 and 66. The vector sum of Ks and Ki equals up to Kp. Thus, by aligning the particular optical parametric oscillator to select, for instance, the signal to resonate, vector addition is conserved. It has been found that the idler, while nonetheless being produced, has a narrowed line width as compared to the colinear phase matching case.

Figure 6:
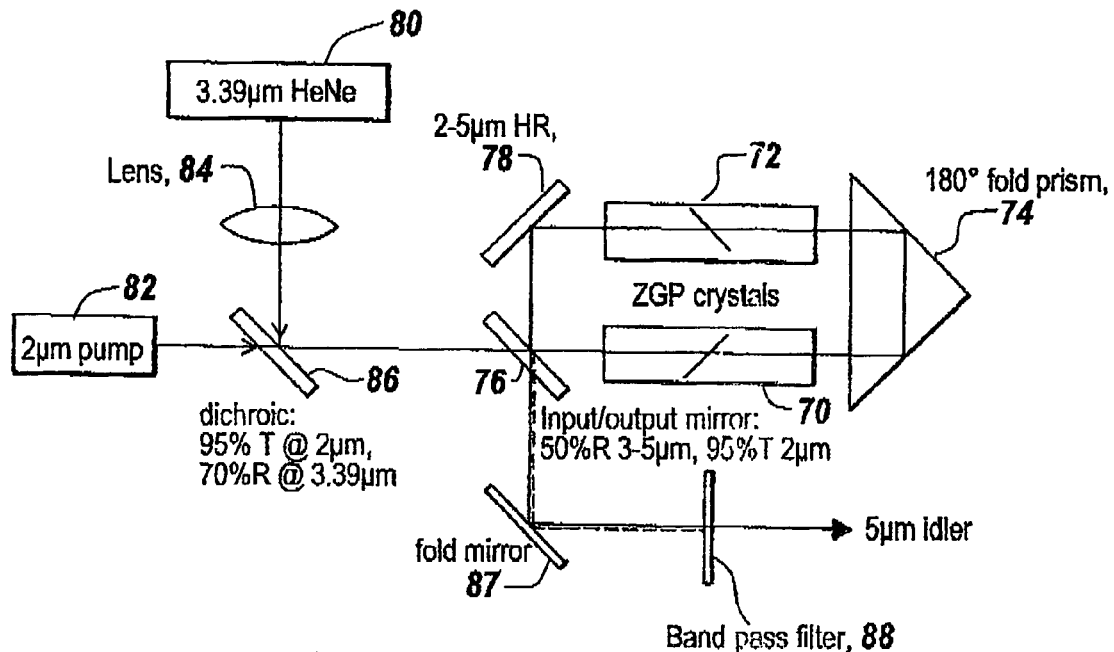
FIG. 6 is a diagrammatic illustration of a ring type ZGP OPO, illustrating the generation of the 5 micron idler with a 2 micron pump and a 3.39 micron seed.

In order to confirm the results described above, an experiment was devised as illustrated in FIG. 6.

The pump laser used for this experiment has been described in detail elsewhere as is disclosed in P. A. Budni, L. A. Pomeranz, M. L. Lemons, P. G. Schunemann, T. M. Pollak, and E. P. Chicklis, "10 W Mid-IR holmium pumped $ZnGeP_2$ OPO," OSA Trends in Optics and Photonics Vol. 19, Advanced Solid State Lasers, Walter R. Bosenberg and Martin M. Fejer, eds. (Optical Society of America, Washington, D.C. 1998), pp. 226–229. It is a cryogenically cooled Tm, Ho:YLF oscillator/amplifier system Q-switched at 10 kHz to produce 1.0-mJ, 25-ns (FWHM) output pulses at 2.05 µm. The systems thus provides a total average power at 2.05 µm of 10 W with a beam quality measured to be $M^2=1.05$. The pump source is not line narrowed, and has a line width of ~0.5 nm. The pump beam was focused to a slightly asymmetric waist of 240 microns in one axis and 300 microns in the other. The beam was also astigmatic, with ~10 cm between the waists, which is comparable to the Rayleigh range. The center between the waists was nominally located in the center of the ZnSe fold prism.

The OPO was comprised of two 14-mm ZGP crystals 70 and 72 cut for Type I phase-matching, a ZnSe 180° fold prism 74, and two flat dielectric mirrors 76 and 78 placed at 45° incidence to complete the rectangular ring geometry. Dielectric mirror 76 serves as an input mirror for the pump and an output coupler for the OPO, while the other mirror 78 is a broadband dielectric HR mirror. The p-polarized pump transmission for the input mirror was measured as 95%, and coating data indicates the average reflectivity in the 3.5- to 4.8-micron range is 50% R for the s-polarized signal and idler waves. The physical length of the OPO resonator was 7.0 cm with an optical cavity length of 16.6 cm.

The seed laser 80 is a dual wavelength (1.15/3.39 µm, 3 mW per line) Research Electro-Optics $TEM_{00}$ HeNe laser. It has a long (~50 cm) cavity length and large mode spacing, making it practically a single-longitudinal-mode source. It was approximately mode-matched to the 21 µm pump 82 with a 5" focal length lens 84. It is folded in via a mirror 86 located just before the input coupler. This mirror introduces another ~5% loss to the pump and ~30% loss of the seed light. This mirror and the input coupler limit the seed power injected to the OPO to ~1 mW.

The output of the OPO is re-directed by a fold mirror 87 through two calibrated filters 88, one to pass both the signal and idler and one to pass the idler only, were used to determine the output power at the signal and idler wavelengths. The output was focused to a 1 mm spot at the entrance slit of a 0.5 m monochromter for spectral measurements. The output slit was removed and the exit plane was re-imaged onto a Spiricon Pyrocam I camera for real-time analysis of wavelength and seeding effectiveness. As the resolution of this set-up is greatly limited, final spectral measurements were made with a 1 m Jarrell Ash monochromater. Beam quality measurements were made by measuring the idler beam diameter with a Photon, Inc. Beam Scan at several positions through a waist and fitting the data to the mixed-mode Gaussian beam propagation describing the $M^2$ parameter.

Non-colinear phase matching was observed by monitoring the spatial profile of the signal and idler beams (after passing through a 2 µm blocking filter) on a UV-activated thermal pad located ~12" from the output coupler. The resonator optics could be adjusted iteratively such that the signal and idler beams were either directly overlapping (colinear phase matching), or two distinct spots separated by ~1 cm (non-colinear phase matching, with ~30 mrad between signal and idler beams).

Using the Spiricon/monochrometer assembly, the two crystals were tuned to an idler wavelength of ~3.39 µm, which required iterative tuning of the resonator. When tuned near degeneracy, the OPO exhibits a slope efficiency of 63%, but performance falls off when signal wavelengths are shorter than ~3.6 µm. This is due in part to the limited bandwidth of the resonator and crystal coatings. It is also believed that pump-induced idler loss plays a significant role as is disclosed in N. P. Barnes, K. E. Murray, M. G. Jani, P. G. Schunemann, and T. M. Pollak, "$ZnGeP_2$ Parametric Amplifier," J. Opt. Soc. Am. B 15, 232–238 (1998). Some support for this comes from the fact that the idler power out of the OPO exceeds the signal power. The total slope efficiency for this OPO is 42.5%, with a total output power of 3.5 W (1.7 W in the signal and 1.8 W in the idler). The performance is unaffected by the presence of a seed source and is identical within experimental error in the colinear and non-colinear cases, although large-angle non-colinear phase matching should ultimately reduce efficiency. The beam quality of the idler alone was measured as $M^2=1.70$ and exhibits none of the asymmetry present in the pump source. For reference, the beam quality of the idler from the colinearly phase-matched OPO tuned to 4.72 µm was $M^2=1.26$.

Figure 7:
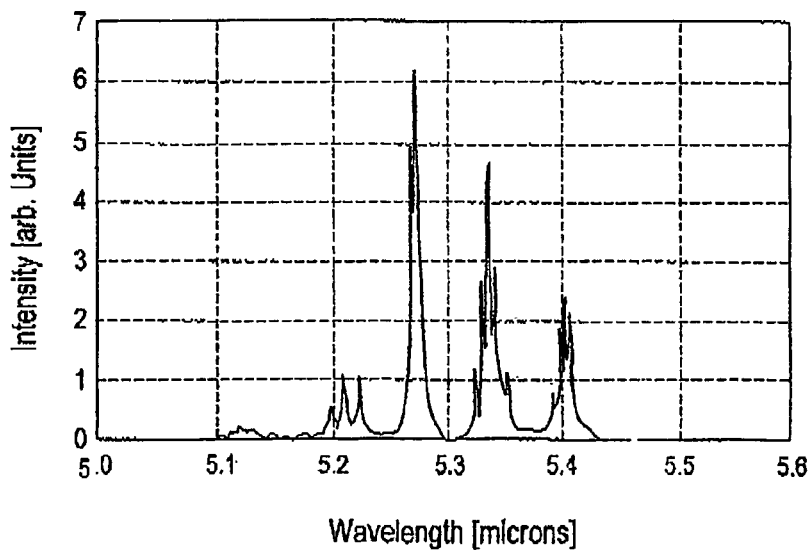
FIG. 7 is a graph of wavelength versus intensity of the output of the ring OPO of FIG. 6, illustrating a strong idler peak at 5.27 microns.
Figure 8:
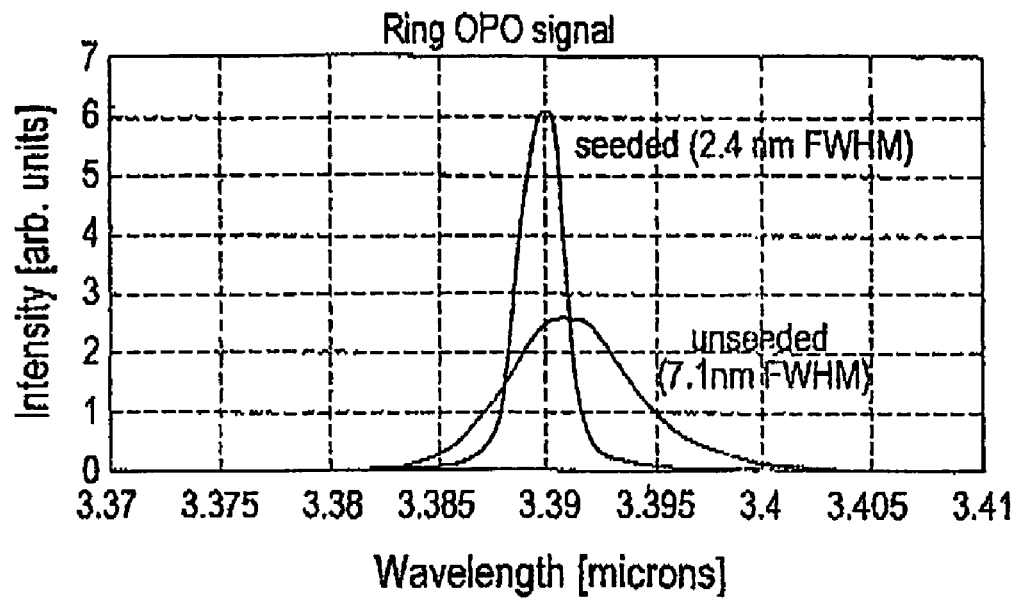
FIG. 8 is a graph of wavelength versus intensity for the ring OPO signal for the seeded and unseeded cases; and, FIG. 9 is a graph of wavelength versus intensity for the ring OPO idler for the seeded and unseeded cases, illustrating a 4–5 nanometer full width at half max (FWHM) line width.
Figure 9:
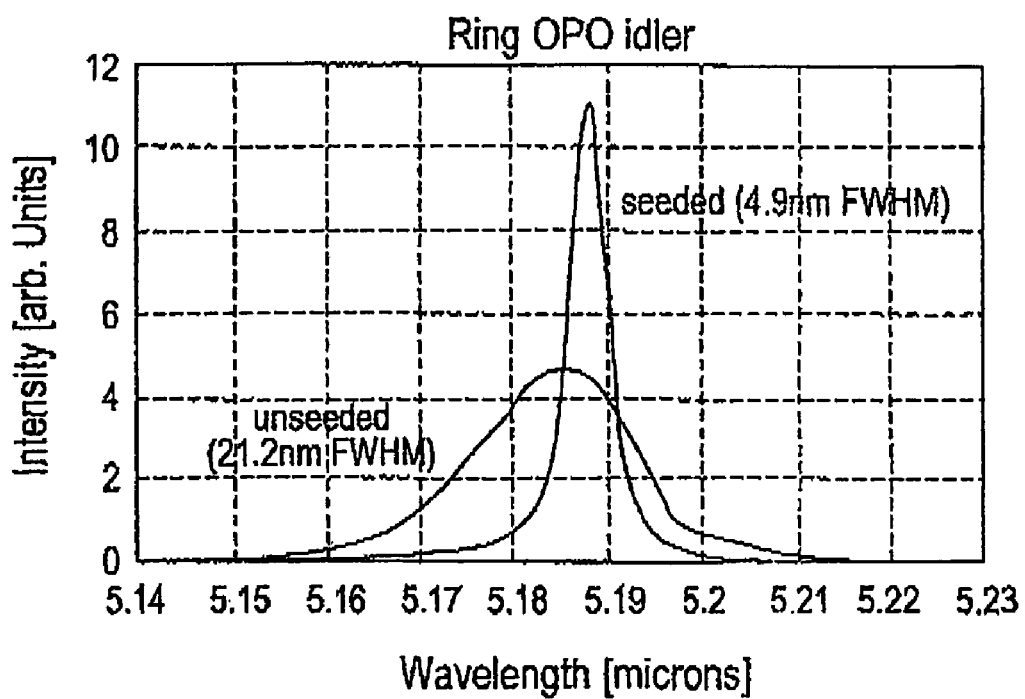

Seeding is optimized by monitoring the exit-slit image of the Spiricon-monochrometer assembly. Unseeded, the OPO idler output is approximately ~20 pixels wide FWHM on the camera. Injecting the seed laser reduces the idler to ~7 pixels FWHM. Actual spectra were then measured using the 1.0 m monochrometer and are presented in FIGS. 7 and 8. The spectral characteristics of a typical colinearly phase matched doubly resonant oscillator DRO have been measured before, as shown in FIG. 7, revealing the common mode beating structure. In such a DRO, the spectral extent of an idler, when tuned to ~5.3 µm, is approximately 200 nm. For the non-colinearly phase matched OPO, the measured line widths are 7.1 nm and 21.2 nm for signal and idler, respectively. Seeding reduces the line widths to 2.4 nm and 4.9 nm for signal and idler. Seeding the colinearly phase matched OPO did not provide a spectrally stable output, probably due to the increased gain bandwidth. This configuration thus requires more seed power to be effective.

This seeded OPO resonator offers promise for high average power, narrow line width mid-IR laser sources without requiring a single longitudinal mode pump laser. The ring geometry allows good overlap between the seed and resonator mode volumes with a compact design. While requirements for a CGA pump source are well suited by a 5.2 µm idler (i.e., 3.39 µm seeded signal), any nm-width infrared laser source can serve as an adequate seed, such as a diode laser or a small master oscillator. The subject system has successfully reduced the typical DRO 5.2 µm idler line width from 160 nm to 4.9 nm; a 40-fold reduction. This has been done without the threshold increase associated with SRO operation, but does result in non-colinear signal and idler beams exiting the OPO. It also permits high average power operation, demonstrating nearly 4 W of mid-IR output, with signal and idler pulse energies of nearly 0.2 mJ each. Thus what has been demonstrated is a useful, spectrally intense pump source for long-wave parametric oscillators.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for generating mid and long wavelength infrared radiation, comprising the step of:
   pumping a tunable optical parametric oscillator with the output of a non-colinearly phase-matched laser-pumped optical parametric oscillator pumped with seeded pumping energy in which the output of an unseeded pump laser is seeded, the laser-pumped optical parametric oscillator having a conventional not-unstable resonator and an output beam of a sufficiently narrow line width to enable production of the mid and long wavelengths, said line width being less than 5 nanometers.

2. The method of claim 1, and further including the step of pumping the laser-pumped optical parametric oscillator with a narrow line width source of pumping energy.

3. The method of claim 2, wherein the step of seeding the pumping energy for the laser-pumped optical parametric oscillator includes a seed having energy corresponding in wavelenght to one of the wavelengths at which the laser-pumped optical parametric oscillator lases.

4. The method of claim 3, wherein the one wavelength is that associated with the signal of the laser-pumped optical parametric oscillator.

5. The method of claim 1, wherein the output that pumps the tunable optical parametric oscillator includes 5 micron energy.

6. The method of claim 5, wherein the line width of the 5 micron energy that pumps the tunable optical parametric oscillator is less than 5 nanometers.

7. The method of claim 1, wherein the tunable optical parametric oscillator is tunable between 5 and 20 microns.

8. A method of providing sufficient pumping energy to pump a tunable optical parametric oscillator so that it is tunable to produce an output between 5 and 20 microns, comprising the step of:
   pumping the tunable optical parametric oscillator with an output from a non-colinearly phase-matched laser-pumped optical parametric oscillator that is non-colinearly phase matched; and is pumped with seeded pumping energy in which the output of an unseeded pumping laser is seeded, the output of the laser-pumped optical parametric oscillator being of a line width less than 5 nanometers to effectively pump the tunable optical parametric oscillator.

9. The method of claim 8, wherein the tunable optical parametric oscillator includes a CdGeAs$_2$ nonlinear crystal, wherein the laser-pumped optical parametric oscillator includes a ZGP nonlinear crystal, and wherein the seeding pumping energy is from an HeNe 3.39 micron source.

10. A system for generating coherent infrared energy in a band from 5–20 microns, comprising:
    a tunable optical parametric oscillator having an output tunable from 5–20 microns; and,
    a non-colinearly phase-matched laser-pumped optical parametric oscillator having a conventional not-unstable resonator, a pumping laser, and a seeding source coupled to the output of said pumping laser, said laser-pumped optical parametric oscillator having an output beam coupled to said tunable optical parametric oscillator and a line width less than 5 nanometers to effectively pump said tunable optical parametric oscillator.

11. The system of claim 10, wherein said tunable optical parametric oscillator includes a CdGeAs$_2$ nonlinear crystal and wherein said laser-pumped optical parametric oscillator includes a ZGP nonlinear crystal.

12. The system of claim 11, wherein said seeded pumping source includes a HeNe laser.

13. The system of claim 12, wherein said seeding source includes a Ho:YLF laser.

14. A method for generating mid and long wavelength infrared radiation, comprising the step of:
    pumping a tunable optical parametric oscillator with the pumping energy from a non-colinearly phase-matched laser-pumped optical parametric oscillator pumped by a pumping laser having an output seeded with the output of a seeding laser, the laser-pumped optical parametric oscillator having a conventional not-unstable resonator and an output of a sufficiently narrow line width to enable production of the mid and long wavelengths, the narrow line width established by seeding the pumping energy to the laser-pumped optical parametric oscillator with energy corresponding in wavelength to one of the wavelengths at which the laser-pumped optical parametric oscillator lases.

15. The method of claim 14, and further including the step of pumping the laser-pumped optical parametric oscillator with a narrow line width source of pumping energy.

16. The method of claim 15, wherein the line width of the source of pumping energy is less than 5 nanometers.

17. The method of claim 14, wherein the one wavelength is that associated with the signal of the laser-pumped optical parametric oscillator.

18. The method of claim 14, wherein the tunable optical parametric oscillator is pumpable with 5-micron energy.

19. The method of claim 18, wherein the line width of the 5 micron energy that pumps the tunable optical parametric oscillator is less than 5 nanometers.

20. The method of claim 14, wherein the tunable optical parametric oscillator is tunable between 5 and 20 microns.

21. A method of providing sufficient pumping energy to pump a tunable optical parametric oscillator so that it is tunable to produce an output between 5 and 20 microns, comprising the step of:
    pumping the tunable optical parametric oscillator with an output from a pumping optical parametric oscillator that is non-colinearly phase-matched and is pumped with seeded pumping energy, the output of the pumping optical parametric oscillator being of a line width less than 5 nanometers to effectively pump the tunable optical parametric oscillator, the tunable optical parametric oscillator including a CdGeAs$_2$ non-linear crystal, the pumping optical parametric oscillator including a ZGB non-linear crystal, the seeding pumping energy being from an HeNe 3.39-micron source.

22. A system for generating coherent infrared energy in a band from 5–20 microns, comprising:
    a tunable optical parametric oscillator including a CdGeAs$_2$ non-linear crystal having an output from 5–20 microns; and,
    a pumping optical parametric oscillator including a ZGP non-linear crystal having an output beam coupled to said tunable optical parametric oscillator and of a line width less than 5 nanometers to effectively pump said tunable optical parametric oscillator.

23. The system of claim 22, wherein said seeded pumping energy includes energy from a source that includes a HeNe laser.

24. The system of claim 23, wherein said seeded pumping energy includes energy from a Ho:YLF laser.

* * * * *